Patented Mar. 3, 1953

2,630,458

UNITED STATES PATENT OFFICE 2,630,458

3-ALKYL-2,2'-DIHYDROXY-3',5,5'-TRIHALO-DIPHENYLMETHANES

Clarence L. Moyle, Clare, and Paul A. Wolf, Midland, Mich., assignors to The Dow Chemical Company, Midland, Mich., a corporation of Delaware No Drawing. Application June 26, 1951,
Serial No. 233,704

8 Claims. (Cl. 260—619)

1

This invention is concerned with the 3-alkyl-2, 2'-dihydroxy-3',5,5'-trihalodiphenylmethanes having the formula

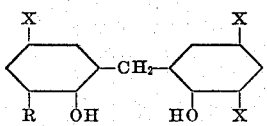

In this and succeeding formulae, R represents a propyl or butyl radical and each X represents bromine or chlorine. The new diphenol compounds are crystalline solids, somewhat soluble in aqueous alkali hydroxides and in many organic solvents and substantially insoluble in water. They have been found to exert a strong antimicrobial action against bacteria and fungi and may be employed as antimicrobial constituents of fatty acid soaps, synthetic detergent compositions, rubber goods, plastics, surgical dressings, cosmetics, dentifrices, ointments and creams to render such materials germicidal.

The new diphenols may be prepared by various methods. One such method comprises reacting a 2-alkyl-4-halophenol of the formula

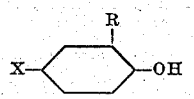

with a 3,5-dihalosaligenin of the formula

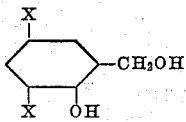

in the presence of an acid condensing agent.

The acid condensing agent may be, for example, sulfuric acid or glacial acetic acid saturated with hydrogen chloride. Good results are obtained with sulfuric acid of 70 to 100 percent concentration. It is sometimes advantageous to use a mixture of sulfuric acid and glacial acetic acid as the condensing agent.

The 4-halo-2-alkylphenols employed in preparing the compounds of the present invention are inclusive of the 4-chloro- and 4-bromo-2-alkylphenol compounds, wherein the alkyl substituent may be normalpropyl, isopropyl, normalbutyl, isobutyl, secondarybutyl and tertiarybutyl radicals.

The proportions of alkyl-halophenol and dihalo-saligenin are not critical, but best results have been obtained when there is present in the reaction mixture at least one molecular proportion of the alkyl-halophenol for each molecular

2 proportion of the saligenin compound. From 8 to 20 moles of 70-100 percent sulfuric acid per mole of saligenin compound is conveniently employed in the reaction.

In a representative operation, the 2-alkyl-4-halophenol and 3,5-dihalosaligenin are dispersed in aqueous 70-80 percent sulfuric acid with stirring. The condensation begins immediately with the production of the desired product and water of reaction. The admixture of reactants is carried out at a temperature of from 20° to 35° C. and the temperature of the reaction mixture thereafter raised to from 70° to 130° C. for a period of time to complete the reaction.

The desired product may be separated from the crude reaction mixture by various procedures. Thus, the reaction product may be washed with water and the diphenol in the washed product converted to a soluble salt by reaction with an aqueous alkali metal hydroxide. The desired compound is then regenerated by acidification of its aqueous salt solution and thereafter separated as by filtration or decantation. The product so obtained may be further purified by recrystallization from various organic solvents.

In a further procedure the alkyl-halophenol and saligenin compounds are mixed together and the condensing agent added portionwise with stirring. Alternatively, the phenol may be dispersed in aqueous 70-80 percent sulfuric acid and the saligenin compound subsequently added portionwise with stirring. In either procedure the conditions of reaction and isolation of the desired product are essentially as set forth above.

Another method for preparing the new compounds comprises reacting a 3-propyl or 3-butyl-5-halosaligenin with a 2,4-dihalophenol, the halogen in each instance being chlorine or bromine. The mode of contacting of the reactants, the molecular proportions of phenol and saligenin compound, the nature and proportions of acid condensing agent, and the reaction conditions and methods of separation are all as previously described. Again the alkyl substituent in the saligenin compound may be either straight chain or branched in configuration and inclusive of the normalpropyl, isopropyl, normalbutyl, isobutyl, secondarybutyl and tertiarybutyl.

The saligenin products employed as starting materials in the above procedures are crystalline solids or viscous oils, substantially insoluble in water, soluble in aqueous alkalis and somewhat soluble in many organic solvents. They may be prepared by reacting an appropriate sodium phenolate with a small molecular excess of formaldehyde. In carrying out such preparation, the aforementioned 2,4-dihalophenol or 2-alkyl-4-halophenol is dissolved in an aqueous solution of an equimolecular proportion of sodium hydroxide to prepare a solution of the corresponding phenolate. This solution is then added to an aqueous solution of the formaldehyde at a temperature of from 20° to 50° C., and the resulting mixture maintained at from 25° to 90° C. for a period of time to complete the reaction. The reaction mixture is then acidified, as with acetic acid or hydrochloric acid, and the desired product separated in the usual manner, as by washing with water, decantation and recrystallization.

The following examples serve to illustrate the invention, but are not to be construed as limiting the same.

EXAMPLE 1

3-Normalbutyl-2,2'-dihydroxy-3',5,5'-trichlorodiphenylmethane

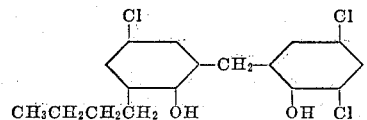

9.2 grams (0.05 mole) of 2-normalbutyl-4-chlorophenol (boiling at 151° to 152° C. under a pressure of 18 millimeters), 8.65 grams (0.05 mole) of 3,5-dichlorosaligenin (melting at 79.5° to 80.5° C.) and 100 grams of aqueous 80 percent sulfuric acid were mixed together at room temperature with stirring. The latter operation was accompanied by the evolution of heat and the temperature of the mixture rose to 34° C. over a period of five minutes. Stirring was thereafter continued and the temperature of the mixture gradually raised over a period of 3 hours to 98° C. to complete the reaction. During the heating period the reaction mixture became very viscous and was diluted by the addition of 10 milliliters of chlorobenzene. The reaction vessel and contents were then cooled to room temperature, and the precipitated crude reaction product was separated by decantation, washed with water and dissolved in methanol. The methanol solution was made alkaline by addition of dilute aqueous sodium hydroxide. This alkaline solution was then acidified with aqueous hydrochloric acid, the mixture separating into an acidic liquid layer and a solid mass. The latter was separated by decantation and thereafter successively recrystallized from (1) a mixture of 60 parts by weight of xylene and 40 parts of petroleum hydrocarbon distillate boiling at 80°–100° C. (80°–100° Skellysolve), and (2) a mixture of equal parts by weight of toluene and 80°–100° Skellysolve to obtain a 3-normalbutyl-2,2'-dihydroxy-3',5,5'-trichlorodiphenylmethane product. The latter is a cream colored, crystalline solid melting at 113°–114° C.

EXAMPLE 2

3-isopropyl-2,2'-dihydroxy-3',5,5'-trichlorodiphenylmethane

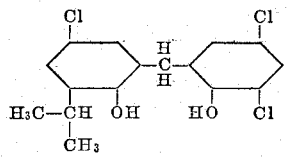

177.3 grams (1.087 moles) of 2,4-dichlorophenol was dissolved in 174 milliliters (1.087 moles) of aqueous 20 percent sodium hydroxide to prepare an aqueous solution of the corresponding phenolate. 115 grams (1.38 moles) of aqueous 36 percent formaldehyde was added to the above phenolate solution with stirring and at 47° C. Stirring was then continued for 29 hours at a temperature of from 38° to 50° C. and the reaction mixture thereafter set aside for 4 days at room temperature to complete the reaction. The reaction product was then acidified with aqueous 50 percent acetic acid, the resulting mixture separating into an acid liquid layer and a viscous oil. The latter was separated, washed with water, washed twice with a petroleum hydrocarbon fraction boiling at 100° to 140° C. (100°–140° Skellysolve) and dried. Upon standing for several days the washed and dried oil crystallized as a 3,5-dichlorosaligenin product.

20.6 grams of the above 3,5-dichlorosaligenin product was added portionwise with stirring to a dispersion of 29 grams of 4-chloro-2-isopropylphenol (having a freezing point of 41° C.) in 150 grams of aqueous 70 percent sulfuric acid. The addition was carried out over a period of two hours and at a temperature of from 60° to 72° C. Stirring was maintained and the reaction mixture further heated over a period of 8 hours at temperatures gradually increasing up to 99° C. to complete the reaction. The reaction vessel and contents were then cooled to room temperature, the mixture separating into an aqueous acid layer and a water-immiscible crude reaction product. The latter was separated, washed with water and dissolved in dilute aqueous sodium hydroxide at 60° C. This solution was then acidified with aqueous hydrochloric acid to precipitate a crude diphenol product as a sticky amorphous mass. The latter was separated, washed with water, recrystallized twice from 80°–100° Skellysolve and thereafter recrystallized from tetrachloroethylene to obtain a 3-isopropyl-2,2'-dihydroxy-3',5,5'-trichlorodiphenyl-methane product as a white crystalline solid melting at 123° to 123.8° C.

EXAMPLE 3

3-secondarybutyl-2,2'-dihydroxy-3',5,5'-trichlorodiphenylmethane

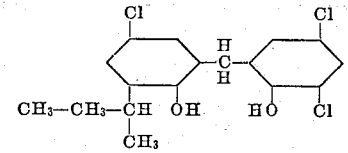

18.45 grams (0.1 mole) of 2-secondarybutyl-4-chlorophenol (having a freezing point of 53.9° C.) and 19.3 grams (0.1 mole) of 3,5-dichlorosaligenin were dispersed in 100 grams of aqueous 80 percent sulfuric acid at a temperature of 33° C. The crude reaction mixture was then heated with stirring over a period of 5 hours at a temperature of from 60° to 90° C. to complete the reaction. During the reaction the mixture separated into a liquid acid layer and a soft taffy-like mass. The latter was separated and thereafter dissolved in dilute aqueous sodium hydroxide. This solution was then acidified with aqueous hydrochloric acid to precipitate the crude diphenol product as a brown sticky mass. The latter was separated and successively recrystallized from a mixture of 80°–100° Skellysolve and from tetrachloroethylene to obtain a 3-secondarybutyl-2,2'-dihydroxy-3',5,5-trichlorodiphenylmethane product as a white crystalline solid melting at 110.5° to 111° C.

EXAMPLE 4

*3-isopropyl-2,2'-dihydroxy-5'-bromo-3',5-dichlorodiphenylmethane*

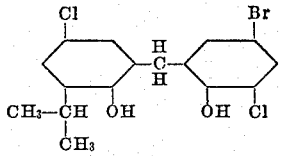

119 grams (0.7 mole) of 4-chloro-2-isopropyl phenol (freezing at 41° C.) was dissolved with stirring in 117.5 milliliters (0.7 mole) of aqueous 20 percent sodium hydroxide solution to prepare an aqueous solution of the corresponding phenolate. This solution was mixed with 73 grams (0.875 mole) of aqueous 36 percent formaldehyde solution at a temperature of 34° C. Stirring was continued for 5 hours at a temperature of from 26° to 34° C. and the reaction mixture thereafter set aside for 15 hours at room temperature to complete the reaction. The mixture was then neutralized with 84 grams (0.7 mole) of an aqueous 50 percent acetic acid solution, whereupon the crude reaction product precipitated as a water-immiscible layer. The latter was separated by decantation, washed with water and dried under vacuum to obtain a 5-chloro-3-isopropylsaligenin product as a viscous, orange oil having a refractive index (N/D) of 1.5457 at 35° C. and a density of 1.15 at 26° C.

20 grams (0.1 mole) of the above 5-chloro-3-isopropylsaligenin product and 20.75 grams (0.1 mole) of 4-bromo-2-chlorophenol were dissolved with stirring in 12 grams (0.2 mole) of glacial acetic acid and cooled to 15° C. 18.3 grams of aqueous 99 percent sulfuric acid was added portionwise to the above mixture over a period of 10 minutes with stirring. The latter operation was accompanied by the evolution of heat and the temperature of the mixture rose to 36° C. Stirring was continued and the temperature of the reaction mixture gradually raised over a period of 30 minutes to 83° C. This same temperature was maintained for 1.5 hours to complete the reaction. The crude reaction mixture was cooled, washed twice with water at 80° C. and the water-immiscible residue dissolved in an aqueous solution containing 17.4 percent by weight of methanol and 4 percent by weight of sodium hydroxide. The latter solution was filtered and the filtrate acidified with aqueous hydrochloric acid. The crude reaction product separated into a brown oil. This oil was recovered by decantation and successively washed with (1) a hot solution consisting of 35 cc. of methanol and 10 cc. of 12 normal hydrochloric acid and (2) with water. The residue was dissolved in boiling 100°–140° Skellysolve. This solution was cooled to room temperature, the mixture separating into a solvent layer and a brown oil layer. The oil was separated and dissolved at a temperature of 75° C. in a mixture of 60 parts by weight of carbon tetrachloride to 20 parts of 80°–100° Skellysolve. The latter solution was cooled to room temperature, the crude product precipitating as a tan, crystalline solid. This solid was separated, washed with 80°–100° Skellysolve and recrystallized twice from a mixture of one part by weight of toluene to one part by weight of 80°–100° Skellysolve to obtain a 3-isopropyl-2,2'-dihydroxy-5'-bromo-3',5-dichlorodiphenylmethane product as a cream-colored crystalline solid, melting at 125.5° to 126° C.

EXAMPLE 5

*3 - isopropyl - 2,2' - dihydroxy - 5 - chloro - 3'5'-dibromodiphenylmethane*

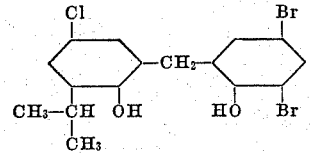

25.2 grams (0.1 mole) of 2,4-dibromophenol was mixed in 20 grams (0.1 mole) of the 5-chloro-3-isopropylsaligenin product as described in Example 4 and cooled to 15° C. Ten milliliters of aqueous 99 percent sulfuric acid was added portionwise to the above dispersion over a period of 20 minutes with stirring. The latter operation was accompanied by the evolution of heat and the temperature of the reaction mixture rose gradually to 44° C. During the addition a dark, very viscous oil separated and 10 milliliters of chlorobenzene was added to the reaction zone as diluent. Stirring was then continued and the temperature of the reaction mixture gradually raised over the course of an hour to 70° C. to complete the reaction. The reaction vessel and contents were then cooled, and the crude reaction product washed twice with water at 40°–45° C. and thereafter dissolved in an aqueous solution containing 18.6 percent by weight of methanol and 2.2 percent by weight of sodium hydroxide. The resulting solution was acidified with aqueous hydrochloric acid, the crude diphenol product precipitating as a dark oil. The latter was separated by decantation, washed with water and dissolved at 90° C. in 100°–140° Skellysolve. The resulting solution was cooled to room temperature, to precipitate a crop of brown crystals. These crystals were separated, successively recrystallized from chlorobenzene, toluene and a mixture of 50 parts by weight of xylene and 50 parts by weight of 80°–100° Skellysolve to obtain a 3-isopropyl-2,2'-dihydroxy-5-chloro-3',5' - dibromodiphenylmethane product. The latter is a tan crystalline solid melting at 124.6° to 125° C.

EXAMPLE 6

*3 - normalpropyl - 2,2' - dihydroxy - 5 - bromo-3',5'-dichlorodiphenylmethane*

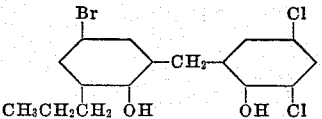

21.5 grams (0.1 mole) of 4-bromo-2-normalpropylphenol (melting at 42° C.) is dispersed in 150 grams of aqueous 70 percent sulfuric acid and 19.3 grams (0.1 mole) of 3,5-dichlorosaligenin added portionwise thereto with stirring. The addition is carried out over a period of two hours and at a temperature of from 60° to 75° C. The reaction mixture is then further heated over a period of 8 hours at temperatures gradually increasing to 90° C. to complete the reaction. The crude reaction product is then processed as described in Example 2 to obtain a 3-normalpropyl - 2,2' - dihydroxy - 5 - bromo - 3',5' - dichlorodiphenylmethane product as a crystalline solid.

It has been discovered that the compounds of this invention are particularly valuable as constituents of toilet, washing and so-called liquid soaps. When any one of these compounds is incorporated in soap compositions, it retains its germicidal effectiveness against a number of bacterial organisms. In preparing such soap compositions, the diphenol product may be added directly to the detergent soap during the crutching, milling or similar operation. Another mode of operation comprises dissolving the germicidal diphenol in a suitable solvent, such as alcohol or acetone, and dispersing the resulting solution in the detergent soap. In general, any method which results in the germicidal agent being uniformly distributed in the final soap product is satisfactory. Suitable concentrations of the germicide in the new soap compositions are in the order of from 1 to 3 percent by weight of the soap.

Aqueous soap compositions containing representative diphenol compounds of the present invention have been tested for the control of *Staphylococcus aureus*. In such operations 100 percent kills of the test organism were obtained in from 2 to 3 minutes with concentrations of the diphenol compounds of from 1 part in 7,000 to 1 part in 10,000.

We claim:
1. A 3-alkyl-2,2'-dihydroxy-3',5,5'-trihalodiphenylmethane having the formula:

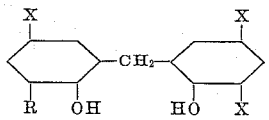

wherein R represents a member of the group consisting of propyl and butyl radicals and each X represents a member of the group consisting of bromine and chlorine.

2. A 3 - alkyl - 2,2' - dihydroxy - 3',5,5' - trihalodiphenylmethane having the formula:

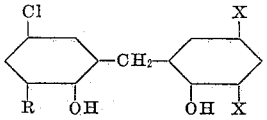

wherein R represents a member of the group consisting of propyl and butyl radicals and each X represents a member of the group consisting of bromine and chlorine.

3. A 3 - alkyl - 2,2' - dihydroxy - 3',5,5' - trichlorodiphenylmethane having the formula:

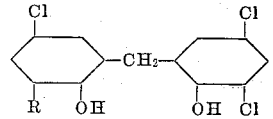

wherein R represents a member of the group consisting of propyl and butyl radicals.

4. 3 - isopropyl - 2,2' - dihydroxy - 3',5,5'-trichlorodiphenylmethane.

5. 3 - secondarybutyl - 2,2' - dihydroxy - 3',5,5-trichlorodiphenylmethane.

6. 3 - isopropyl - 2,2' - dihydroxy - 5' - bromo-3',5-dichlorodiphenylmethane.

7. 3 - isopropyl - 2,2' - dihydroxy - 5 - chloro-3',5'dibromodiphenylmethane 8. 3 - normalbutyl-2,2' - dihydroxy - 3',5,5'-trichlorodiphenylmethane.

CLARENCE L. MOYLE.
PAUL A. WOLF.

REFERENCES CITED

The following references are of record in the file of this patent:

UNITED STATES PATENTS

| Number | Name | Date |
|---|---|---|
| 2,440,909 | Niederl | May 4, 1948 |
| 2,544,826 | Craig, Jr. | Mar. 13, 1951 |

OTHER REFERENCES

Florestano, J. Pharmacol. Exptl. Therapy, vol. 96, pp. 238–49 (1949) (12 pages).